(12) United States Patent
Kitamura

(10) Patent No.: US 11,760,955 B2
(45) Date of Patent: Sep. 19, 2023

(54) WATER-SOLUBLE METAL PROCESSING OIL COMPOSITION

(71) Applicant: Idemitsu Kosan Co., Ltd., Chiyoda-ku (JP)

(72) Inventor: Tomohiko Kitamura, Chiba (JP)

(73) Assignee: Idemitsu Kosan Co., Ltd., Chiyoda-ku (JP)

( * ) Notice: Subject to any disclaimer, the term of this patent is extended or adjusted under 35 U.S.C. 154(b) by 0 days.

(21) Appl. No.: 17/431,897

(22) PCT Filed: Mar. 25, 2020

(86) PCT No.: PCT/JP2020/013222
§ 371 (c)(1),
(2) Date: Aug. 18, 2021

(87) PCT Pub. No.: WO2020/196585
PCT Pub. Date: Oct. 1, 2020

(65) Prior Publication Data
US 2022/0145209 A1    May 12, 2022

(30) Foreign Application Priority Data
Mar. 26, 2019  (JP) ................. 2019-057520

(51) Int. Cl.
| | | |
|---|---|---|
| C10M 173/00 | (2006.01) | |
| C10M 101/02 | (2006.01) | |
| C10M 101/04 | (2006.01) | |
| C10M 129/40 | (2006.01) | |
| C10M 133/02 | (2006.01) | |
| C10M 145/24 | (2006.01) | |
| C10M 161/00 | (2006.01) | |
| C10N 40/20 | (2006.01) | |
| C10N 30/00 | (2006.01) | |
| C10N 20/02 | (2006.01) | |
| C10N 30/06 | (2006.01) | |

(52) U.S. Cl.
CPC ........ *C10M 173/00* (2013.01); *C10M 101/02* (2013.01); *C10M 101/04* (2013.01); *C10M 129/40* (2013.01); *C10M 133/02* (2013.01); *C10M 145/24* (2013.01); *C10M 161/00* (2013.01); *C10M 2201/02* (2013.01); *C10M 2201/0433* (2013.01); *C10M 2207/126* (2013.01); *C10M 2207/18* (2013.01); *C10M 2207/22* (2013.01); *C10M 2209/107* (2013.01); *C10M 2215/02* (2013.01); *C10M 2215/04* (2013.01); *C10M 2215/042* (2013.01); *C10M 2219/024* (2013.01); *C10N 2020/02* (2013.01); *C10N 2030/06* (2013.01); *C10N 2030/24* (2020.05); *C10N 2030/52* (2020.05); *C10N 2040/244* (2020.05); *C10N 2040/246* (2020.05); *C10N 2040/247* (2020.05)

(58) Field of Classification Search
CPC .............. C10M 101/02; C10M 101/04; C10M 129/04; C10M 133/02; C10M 145/24; C10M 2201/0433; C10M 2207/126; C10M 2209/107; C10M 2215/02; C10N 2020/02; C10N 2030/52; C10N 2040/24; C10N 2040/241; C10N 2040/242; C10N 2040/243; C10N 2040/244; C10N 2040/245; C10N 2040/246; C10N 2040/247
See application file for complete search history.

(56) References Cited

U.S. PATENT DOCUMENTS

| | | | |
|---|---|---|---|
| 4,042,515 A | 8/1977 | van Zalm | |
| 5,391,310 A | 2/1995 | Krueger et al. | |
| 6,204,225 B1 * | 3/2001 | Lightcap, Jr. ........ | C10M 129/76 508/501 |
| 9,029,306 B2 | 5/2015 | Takagi et al. | |
| 2014/0326117 A1 | 11/2014 | Takagi et al. | |
| 2015/0299599 A1 * | 10/2015 | Takagi ................. | C10M 173/00 451/28 |
| 2016/0326450 A1 * | 11/2016 | Kitamura ............. | C10M 125/06 |

FOREIGN PATENT DOCUMENTS

| | | |
|---|---|---|
| CN | 107502437 A | 12/2017 |
| CN | 108138076 A | 6/2018 |
| CN | 108603135 A | 9/2018 |
| CN | 108998178 A | 12/2018 |
| JP | 51-45669 | 4/1976 |

(Continued)

OTHER PUBLICATIONS

International Search Report dated Jun. 23, 2020 in PCT/JP2020/013222 filed on Mar. 25, 2020, 3 pages.

(Continued)

*Primary Examiner* — James C Goloboy
(74) *Attorney, Agent, or Firm* — Oblon, McClelland, Maier & Neustadt, L.L.P.

(57) ABSTRACT

The present invention provides a water-soluble metalworking oil composition, including: 5.0 to 20.0 mass % of a sulfur compound (A) that is one or more kinds selected from the group consisting of a sulfurized fat and oil and a sulfurized ester and has a kinematic viscosity of 10 to 800 $mm^2/s$ at 40° C.; 0.5 to 20.0 mass % of the nonionic surfactant (B) having an HLB of 6 to 18; 7.0 to 30.0 mass % of an unsaturated fatty acid polymer (C); and an amine compound (D) selected from the group consisting of a tertiary amine and a secondary amine.

15 Claims, No Drawings

(56) References Cited

FOREIGN PATENT DOCUMENTS

| | | |
|---|---|---|
| JP | 57-159891 A | 10/1982 |
| JP | 60-60193 A | 4/1985 |
| JP | 61-291686 A | 12/1986 |
| JP | 5-43888 A | 2/1993 |
| JP | 6-256789 A | 9/1994 |
| JP | 7-157793 A | 6/1995 |
| JP | 11-279581 A | 10/1999 |
| JP | 2016-145293 A | 8/2016 |
| WO | WO 2013/073617 A1 | 5/2013 |
| WO | WO 2016/125761 A1 | 8/2016 |
| WO | WO-2016125761 A1 * | 8/2016 .......... C10M 101/02 |
| WO | WO 2017/141989 A1 | 8/2017 |

OTHER PUBLICATIONS

Combined Chinese Office Action and Search Report dated Jun. 14, 2022 in Chinese Patent Application No. 202080023643.1, 11 pages.
Examination Report dated Feb. 1, 2023 in Indian Application No. 202147047102.

* cited by examiner

WATER-SOLUBLE METAL PROCESSING OIL COMPOSITION

TECHNICAL FIELD

The present invention relates to a water-soluble metalworking oil composition, a metalworking fluid obtained by diluting the water-soluble metalworking oil composition with the addition of dilution water, and a metalworking method for processing a workpiece made of metal using the water-soluble metalworking oil composition or the metalworking fluid.

BACKGROUND ART

In the field of metalworking such as cutting and grinding, metalworking oil is used at the time of processing metal that is a workpiece for the purpose of improving processability, suppressing friction between the workpiece and a processing tool, suppressing wear of a tool, and removing swarf.

Examples of the metalworking oil include an oily metalworking oil containing an oil component such as a mineral oil, a synthetic oil, or an animal or plant oil as a main component, and a water-soluble metalworking oil that is imparted water solubility by blending a compound with surface activity with the oil. In recent years, the water-soluble metalworking oil has been used for safety reasons such as a low risk of fire.

For example, Patent Literature 1 discloses a water-soluble metalworking oil composition obtained by blending an oil component selected from a mineral oil, a synthetic oil, and a fat and oil, one or more kinds selected from a predetermined amount of an unsaturated fatty acid and a polymer thereof, a sulfur-based extreme pressure agent, and an amine compound having a predetermined base number.

In addition, Patent Literature 2 discloses a water-soluble oil agent for metalworking containing an extreme pressure agent, a polymeric cationic compound, an alicyclic amine and/or an aromatic amine, a basic substance that neutralizes and solubilizes a monocarboxylic acid and/or a dicarboxylic acid and the carboxylic acid, a polyoxyalkylene glycol, and water.

CITATION LIST

Patent Literature

Patent Literature 1: JP 2016-145293 A
Patent Literature 2: JP H11-279581 A

SUMMARY OF INVENTION

Technical Problem

By the way, regarding the water-soluble metalworking oils of Patent Literatures 1 and 2 and the like, there is room for further improvement in processability and various properties that can be applied to a workpiece that is more difficult to process.

Therefore, there is a demand for a water-soluble metalworking oil composition in which at least one of various properties is improved so that the water-soluble metalworking oil composition can be more suitably used in metalworking than before.

Solution to Problem

The present invention provides a water-soluble metalworking oil composition in which a sulfur compound that is one or more kinds selected from the group consisting of a sulfurized fat and oil and a sulfurized ester and has a predetermined kinematic viscosity; a nonionic surfactant having a specific HLB; an unsaturated fatty acid polymer; and a predetermined amine compound are prepared in a predetermined content range.

The present invention provides the following [1] to [16].

[1] A water-soluble metalworking oil composition, including:

5.0 to 20.0 mass % of a sulfur compound (A) that is one or more kinds selected from the group consisting of a sulfurized fat and oil and a sulfurized ester and has a kinematic viscosity at 40° C. of 10 to 800 mm$^2$/s;

0.5 to 20.0 mass % of a nonionic surfactant (B) having an HLB of 6 to 18;

7.0 to 30.0 mass % of an unsaturated fatty acid polymer (C); and an amine compound (D) selected from the group consisting of a tertiary amine and a secondary amine.

[2] The water-soluble metalworking oil composition according to [1], wherein the component (B) is a polyoxyalkylene alkyl ether (B1) having an alkyl group having 4 to 24 carbon atoms.

[3] The water-soluble metalworking oil composition according to [1] or [2], wherein a content ratio of the component (B) to the component (A), that is, [(B)/(A)] is 0.21 to 1.50 in terms of a mass ratio.

[4] The water-soluble metalworking oil composition according to any one of [1] to [3], wherein a content ratio of the component (C) to the component (A), that is, [(C)/(A)] is 0.90 to 5.00 in terms of a mass ratio.

[5] The water-soluble metalworking oil composition according to any one of [1] to [4], wherein a content ratio of the component (C) to the component (B), that is, [(C)/(B)] is 1.20 to 6.90 in terms of a mass ratio.

[6] The water-soluble metalworking oil composition according to any one of [1] to [5], wherein a content of a component (D) is 5.0 to 40.0 mass % based on the total amount of the water-soluble metalworking oil composition.

[7] The water-soluble metalworking oil composition according to any one of [1] to [6], wherein a content ratio of the component (D) to the component (A), that is, [(D)/(A)] is 1.10 to 6.00 in terms of a mass ratio.

[8] The water-soluble metalworking oil composition according to any one of [1] to [7], wherein a content ratio of the component (D) to the component (B), that is, [(D)/(B)] is 1.0 to 15.0 in terms of a mass ratio.

[9] The water-soluble metalworking oil composition according to any one of [1] to [8], wherein a content ratio of the component (D) to the component (C), that is, [(D)/(C)] is 0.80 to 3.50 in terms of a mass ratio.

[10] The water-soluble metalworking oil composition according to any one of [1] to [9], wherein a ratio of a base number to an acid value of the water-soluble metalworking oil composition, that is, [base number/acid value] is 1.0 to 3.0.

[11] The water-soluble metalworking oil composition according to any one of [1] to [10], which is used for processing a workpiece made of a metal selected from the group consisting of titanium, a titanium alloy, alloy steel, a nickel base alloy, a niobium alloy, a tantalum alloy, a molybdenum alloy, a tungsten alloy, stainless steel, and high manganese steel.

[12] A metalworking fluid obtained by diluting the water-soluble metalworking oil composition according to any one of [1] to [11] with the addition of dilution water.

[13] The metalworking fluid according to [12], wherein the dilution water has a hardness of 0 to 800.

[14] The metalworking fluid according to [12] or [13], wherein the metalworking fluid is obtained by diluting the water-soluble metalworking oil composition with the addition of dilution water to have a dilution concentration of 1 to 50 vol %.

[15] A metalworking method for processing a workpiece made of a metal using the metalworking fluid according to any one of [12] to [14].

[16] A water-soluble metalworking oil composition, including;

a sulfur compound (A) that is one or more kinds selected from the group consisting of sulfurized fat and oil and a sulfurized ester and has a kinematic viscosity at 40° C. of 10 to 800 mm$^2$/s;

a nonionic surfactant (B) having an HLB of 6 to 18;

an unsaturated fatty acid polymer (C); and an amine compound (D) selected from the group consisting of a tertiary amine and a secondary amine, wherein a content ratio of the component (B) to the component (A), that is, [(B)/(A)] is 0.21 to 1.50 in terms of a mass ratio, a content ratio of the component (C) to the component (A), that is, [(C)/(A)] is 0.90 to 5.00 in terms of a mass ratio, and a content ratio of the component (C) to the component (B), that is, [(C)/(B)] is 1.20 to 6.90 in terms of a mass ratio.

Advantageous Effects of Invention

The water-soluble metalworking oil composition according to a preferred aspect of the present invention is excellent in at least one of various properties such as processability, self-emulsifiability, and hard water stability, and the water-soluble metalworking oil composition according to a more preferred aspect is excellent in all of processability, self-emulsifiability, and hard water stability. Therefore, the water-soluble metalworking oil composition can be diluted and suitably used as a metalworking fluid.

DESCRIPTION OF EMBODIMENTS

In the following description of the present description, the definition of the range regarding the content of each component and the content ratio of the two components may be a definition of only the preferred lower limit value or upper limit value described below, or may be a definition obtained by appropriately selecting and combining the respective options of the preferred lower limit value and upper limit value.

[Configuration of Water-Soluble Metalworking Oil Composition]

The water-soluble metalworking oil composition of the present invention contains a sulfur compound (A) which is one or more kinds selected from the group consisting of a sulfurized fat and oil and a sulfurized ester and has a kinematic viscosity at 40° C. of 10 to 800 mm$^2$/s, a nonionic surfactant (B) having an HLB of 6 to 18, an unsaturated fatty acid polymer (C), and an amine compound (D) selected from the group consisting of a tertiary amine and a secondary amine.

The water-soluble metalworking oil composition according to an aspect of the present invention is diluted into a metalworking fluid, and then used for metalworking. That is, the water-soluble metalworking oil composition is a stock solution of a metalworking fluid, and is not directly used for metalworking.

For example, the water-soluble metalworking oil compositions as described in Patent Literatures 1 and 2 have good processability for an ordinary workpiece, but have problems in terms of processability, for example, for difficult-to-process materials such as stainless steel, increase in tool wear and cannot handle high-speed processing and must perform low-speed processing.

On the other hand, in the present invention, it has been found that when a water-soluble metalworking oil composition contains a predetermined amount of the sulfur compound (A) selected from the above-described sulfurized fat and oil and a sulfurized ester, excellent processability can be exhibited even for difficult-to-process materials such as stainless steel.

However, the sulfur compound (A) selected from a sulfurized fat and oil and a sulfurized ester is hard to be compatible with water and tends to be poor in self-emulsifiability, and particularly when the sulfur compound (A) is diluted with hard water, separation and precipitation are likely to occur, and there is also a problem that the hard water stability is lowered.

Therefore, in view of the above problems, a water-soluble metalworking oil composition according to an aspect of the present invention has been prepared by using the above-described nonionic surfactant (B), unsaturated fatty acid polymer (C), and amine compound (D) in combination with the sulfur compound (A) so as to improve the processability and also improve the self-emulsifiability and the hard water stability.

In the water-soluble metalworking oil composition according to an aspect of the present invention, the content ratio of the component (B) to the component (A), that is, [(B)/(A)] is preferably 0.21 or more, more preferably 0.22 or more, more preferably 0.23 or more, still preferably 0.24 or more, still more preferably 0.25 or more, and particularly preferably 0.27 or more, in terms of a mass ratio, from the viewpoint of obtaining a water-soluble metalworking oil composition having excellent hard water stability, and is preferably 1.50 or less, and more preferably 1.20 or less, more preferably 1.00 or less, still preferably 0.80 or less, still more preferably 0.65 or less, and particularly preferably 0.50 or less, from the viewpoint of obtaining a water-soluble metalworking oil composition that can be a metalworking fluid having excellent processability even for difficult-to-process materials such as stainless steel.

That is, the content ratio of the component (B) to the component (A), that is, [(B)/(A)] is preferably 0.21 to 1.50, more preferably 0.22 to 1.20, more preferably 0.23 to 1.00, still preferably 0.24 to 0.80, and still more preferably 0.25 to 0.65 or 0.27 to 0.50 in terms of a mass ratio.

In the water-soluble metalworking oil composition according to an aspect of the present invention, the content ratio of the component (C) to the component (A), that is, [(C)/(A)] is, in terms of a mass ratio, preferably 0.90 or more, more preferably 0.95 or more, still preferably 1.00 or more, still more preferably 1.05 or more, and particularly preferably 1.10 or more from the viewpoint of obtaining a water-soluble metalworking oil composition having excellent self-emulsifiability and hard water stability, and is preferably 5.00 or less, more preferably 4.00 or less, still preferably 3.00 or less, still more preferably 2.50 or less, and particularly preferably 2.00 or less from the viewpoint of obtaining a water-soluble metalworking oil composition that can be a metalworking fluid having excellent processability even for difficult-to-process materials such as stainless steel.

That is, the content ratio of the component (C) to the component (A), that is, [(C)/(A)] is preferably 0.90 to 5.00, more preferably 0.95 to 4.00, still preferably 1.00 to 3.00, still more preferably 1.05 to 2.50, and particularly preferably 1.10 to 2.00 in terms of a mass ratio.

In the water-soluble metalworking oil composition according to an aspect of the present invention, the content ratio of the component (C) to the component (B), that is, [(C)/(B)] is, in terms of a mass ratio, preferably 1.20 or more, more preferably 1.40 or more, still preferably 1.60 or more, still more preferably 1.80 or more, and particularly preferably 2.00 or more, and is preferably 6.90 or less, more preferably 6.85 or less, still preferably 6.80 or less, still more preferably 6.75 or less, and particularly preferably 6.70 or less, from the viewpoint of obtaining a water-soluble metalworking oil composition excellent in self-emulsifiability and hard water stability.

That is, the content ratio of the component (C) to the component (B), that is, [(C)/(B)] is preferably 1.20 to 6.90, more preferably 1.40 to 6.85, still preferably 1.60 to 6.80, still more preferably 1.80 to 6.75, and particularly preferably 2.00 to 6.70 in terms of a mass ratio.

In the water-soluble metalworking oil composition according to an aspect of the present invention, the content ratio of the component (D) to the component (A), that is, [(D)/(A)] is, in terms of a mass ratio, preferably 1.10 or more, more preferably 1.20 or more, still preferably 1.30 or more, and still more preferably 1.35 or more from the viewpoint of obtaining a water-soluble metalworking oil composition excellent in self-emulsifiability and hard water stability, and is preferably 6.00 or less, more preferably 5.00 or less, still preferably 4.00 or less, and still more preferably 3.00 or less from the viewpoint of obtaining a water-soluble metalworking oil composition that can be a metalworking fluid excellent in processability even for difficult-to-process materials such as stainless steel.

That is, the content ratio of the component (D) to the component (A), that is, [(D)/(A)] is preferably 1.10 to 6.00, more preferably 1.20 to 5.00, still preferably 1.30 to 4.00, and still more preferably 1.35 to 3.00 in terms of a mass ratio.

In the water-soluble metalworking oil composition according to an aspect of the present invention, the content ratio of the component (D) to the component (B), that is, [(D)/(B)] is preferably 1.0 or more, more preferably 1.3 or more, still preferably 1.5 or more, and still more preferably 2.0 or more, and is preferably 15.0 or less, more preferably 13.0 or less, still preferably 12.0 or less, and still more preferably 10.0 or less in terms of a mass ratio.

That is, the content ratio of the component (D) to the component (B), that is, [(D)/(B)] is preferably 1.0 to 15.0, more preferably 1.3 to 13.0, still preferably 1.5 to 12.0, and still more preferably 2.0 to 10.0 in terms of a mass ratio.

In the water-soluble metalworking oil composition according to an aspect of the present invention, the content ratio of the component (D) to the component (C), that is, [(D)/(C)] is preferably 0.80 or more, more preferably 0.85 or more, still preferably 0.90 or more, and still more preferably 0.94 or more, and is preferably 3.50 or less, more preferably 3.00 or less, still preferably 2.50 or less, and still more preferably 2.00 or less in terms of a mass ratio.

That is, the content ratio of the component (D) to the component (C), that is, [(D)/(C)] is preferably 0.80 to 3.50, more preferably 0.85 to 3.00, still preferably 0.90 to 2.50, and still more preferably 0.94 to 2.00 in terms of a mass ratio.

The water-soluble metalworking oil composition according to an aspect of the present invention may further contain water (E) from the viewpoint of imparting flame retardance and improving storage stability.

The water-soluble metalworking oil composition according to an aspect of the present invention may further contain various components other than the components (A) to (E) if necessary, as long as the effect of the present invention is not impaired.

In the water-soluble metalworking oil composition according to an aspect of the present invention, the total content of the components (A), (B), (C), and (D) is preferably 17.5 to 100 mass %, more preferably 20 to 95 mass %, still preferably 30 to 90 mass %, still more preferably 40 to 80 mass %, and particularly preferably 50 to 75 mass %, based on the total amount (100 mass %) of the water-soluble metalworking oil composition.

In the water-soluble metalworking oil composition according to an aspect of the present invention, the total content of the components (A), (B), (C), (D), and (E) is preferably 20 to 100 mass %, more preferably 35 to 100 mass %, still preferably 50 to 100 mass %, still more preferably 60 to 100 mass %, and particularly preferably 70 to 100 mass %, based on the total amount (100 mass %) of the water-soluble metalworking oil composition.

Hereinafter, details of each component contained in the water-soluble metalworking oil composition according to an embodiment of the present invention are described.

<Sulfur Compound (A)>

The water-soluble metalworking oil composition of the present invention contains a sulfur compound (A) which is one or more kinds selected from the group consisting of a sulfurized fat and oil and a sulfurized ester and has a kinematic viscosity at 40° C. of 10 to 800 mm$^2$/s.

The component (A) is a component that contributes to the expression of excellent processability even for difficult-to-process materials such as stainless steel. That is, the water-soluble metalworking oil composition containing the component (A) can be a stock solution of a metalworking fluid capable of suppressing tool wear, increasing processing efficiency of a difficult-to-process material, and improving productivity.

Both the sulfurized fat and oil and the sulfurized ester used as the component (A) are sulfides having an ester bond. Therefore, the component (A) is distinguished from sulfur compounds such as a polysulfide and a sulfurized olefin having no ester bond.

The sulfurized fat and oil used as the component (A) is a sulfide obtained by sulfurizing an oil having an unsaturated bond, and specific examples thereof include sulfides of oils and fats such as beef tallow, lard, soybean oil, rapeseed oil, rice bran oil, coconut oil, palm oil, and palm kernel oil.

Examples of the sulfurized ester used as the component (A) include a compound obtained by sulfur-crosslinking an ester of an unsaturated fatty acid, and examples thereof include a sulfurized ester represented by the following general formula (a-1).

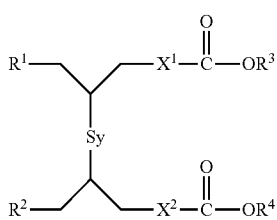

(a-1)

In the general formula (a-1), y is the sulfur crosslinking number, or the average sulfur crosslinking number in the mixture, and preferably 1 to 8, more preferably 2 to 6.

$R^1$ to $R^4$ are each independently a hydrocarbyl group having 1 to 30 carbon atoms, and examples of the hydrocarbyl group include an alkyl group, a cycloalkyl group, an alkenyl group, an alkylcycloalkyl group, an aryl group, an alkylaryl group, and an arylalkyl group, and an alkyl group is preferable. The alkyl group as at least a part of the structure of the above-described hydrocarbyl group may be a linear alkyl group or a branched alkyl group.

$X^1$ and $X^2$ are each independently a hydrocarbylene group having 1 to 10 carbon atoms, and examples of the hydrocarbylene group include an alkylene group, a cycloalkylene group, an alkenylene group, an alkylcycloalkylene group, an arylene group, an alkylarylene group, and an arylalkylene group, and an alkylene group is preferred. The alkylene may be a linear alkylene or a branched alkylene.

The kinematic viscosity at 40° C. of the component (A) used in the present invention is 10 to 800 mm²/s, preferably 20 to 700 mm²/s, more preferably 30 to 600 mm²/s, still preferably 35 to 500 mm²/s, still more preferably 40 to 450 mm²/s, and particularly preferably 45 to 400 mm²/s.

When the kinematic viscosity at 40° C. of the component (A) is within the above range, a water-soluble metalworking oil composition that can be a metalworking fluid having excellent processability even for difficult-to-process materials such as stainless steel can be obtained. In addition, the self-emulsifiability and the hard water stability of the water-soluble metalworking oil composition can be improved.

In the present description, the kinematic viscosity means a value measured in accordance with JIS K2283: 2000.

In the water-soluble metalworking oil composition according to an aspect of the present invention, the content of the component (A) is preferably 5.0 mass % or more, more preferably 6.0 mass % or more, more preferably 7.0 mass % or more, still preferably 10.0 mass % or more, still more preferably 12.0 mass % or more, and particularly preferably 13.0 mass % or more, from the viewpoint of obtaining a water-soluble metalworking oil composition that can be a metalworking fluid having excellent processability even for difficult-to-process materials such as stainless steel, and is preferably 20.0 mass % or less, more preferably 19.5 mass % or less, still preferably 19.0 mass % or less, still more preferably 18.5 mass % or less, and particularly preferably 18.0 mass % or less, from the viewpoint of obtaining a water-soluble metalworking oil composition having excellent self-emulsifiability, hard water stability, and dilution stability, based on the total amount (100 mass %) of the composition.

That is, the content of the component (A) is preferably 5.0 to 20.0 mass %, more preferably 6.0 to 19.5 mass %, more preferably 7.0 to 19.5 mass %, still preferably 10.0 to 19.0 mass %, still more preferably 12.0 to 18.5 mass %, and particularly preferably 13.0 to 18.0 mass %, based on the total amount (100 mass %) of the composition.

<Other Sulfur Compound>

The water-soluble metalworking oil composition according to an aspect of the present invention may contain other sulfur compound other than the sulfurized fat and oil and the sulfurized ester as long as the effect of the present invention is not impaired.

Such other sulfur compound is a sulfide having no ester bond, and examples thereof include a sulfurized olefin, a polysulfide, a polysulfide, a thiadiazole, and an alkylthiocarbamoyl.

However, from the viewpoint of obtaining a water-soluble metalworking oil composition that can be a metalworking fluid having excellent processability even for difficult-to-process materials such as stainless steel, the content of the other sulfur compound is preferably as small as possible.

In the water-soluble metalworking oil composition according to an aspect of the present invention, the content of the sulfur compound other than the component (A) is preferably 0 to 30 parts by mass, more preferably 0 to 10 parts by mass, still preferably 0 to 1 parts by mass, and still more preferably 0 to 0.1 parts by mass, based on 100 parts by mass of the total amount of the component (A).

<Nonionic Surfactant (B)>

The water-soluble metalworking oil composition of the present invention contains a nonionic surfactant (B) having an HLB of 6.0 to 18.0.

As described above, the component (B) is blended in order to suppress a decrease in hard water stability due to the addition of the component (A). That is, the water-soluble metalworking oil composition of the present invention contains the component (B) together with the component (A) to maintain excellent processability when used as a metalworking fluid, and to improve hard water stability.

The HLB of the nonionic surfactant (B) used in an aspect of the present invention is 6.0 or more, preferably 7.0 or more, more preferably 8.0 or more, still preferably 9.0 or more, and still more preferably 10.0 or more, and is 18.0 or less, preferably 17.0 or less, more preferably 16.0 or less, still preferably 15.0 or less, and still more preferably 14.5 or less from the viewpoint of obtaining a water-soluble metalworking oil composition having excellent hard water stability.

That is, the HLB of the nonionic surfactant (B) is 6.0 to 18.0, and is preferably 7.0 to 17.0, more preferably 8.0 to 16.0, still preferably 9.0 to 15.0, and still more preferably 10.0 to 14.5.

In the present description, the HLB means a value calculated by the Griffin method.

Examples of the nonionic surfactant (B) used in one aspect of the present invention include compounds having an HLB in the above range, such as an alkylene glycol, a polyoxyalkylene glycol, a polyoxyalkylene alkyl ether, a polyoxyalkylene aryl ether, an alkylphenol ethylene oxide adduct, a higher alcohol ethylene oxide adduct, a polyoxyalkylene fatty acid ester, a fatty acid ester of glycerin and pentaerythritol, a fatty acid ester of sucrose, a fatty acid ester of a polyoxyalkylene adduct of polyhydric alcohol, an alkyl polyglycoside, and a fatty acid alkanolamide.

These nonionic surfactants (B) may be used alone or in combination of two or more thereof.

Among them, the nonionic surfactant (B) is preferably a polyoxyalkylene alkyl ether (B1) having an alkyl group having 4 to 24 carbon atoms from the viewpoint of obtaining a water-soluble metalworking oil composition having excellent hard water stability.

From the above viewpoint, the number of carbon atoms of the alkyl group of the polyoxyalkylene alkyl ether (B1) is preferably 4 to 24, more preferably 6 to 20, still preferably 8 to 16, and still more preferably 10 to 13.

The alkyl group may be a linear alkyl group or a branched alkyl group.

Furthermore, the (poly) oxyalkylene alkyl ether (B1) is preferably a compound represented by the following general formula (b-1).

(b-1)

In the general formula b-1), R is an alkyl group having 4 to 24 carbon atoms, and preferred aspects of the alkyl group is as described above.

In addition, p and q are numbers of 0 or more, and are appropriately adjusted so that the HLB falls within the above-described range. However, p+q is 1 or more.

In the water-soluble metalworking oil composition according to an aspect of the present invention, the content of the component (B) is preferably 0.5 mass % or more, more preferably 1.0 mass % or more, still preferably 1.5 mass % or more, still more preferably 2.0 mass % or more, and particularly preferably 3.0 mass % or more, from the viewpoint of obtaining a water-soluble metalworking oil composition having excellent hard water stability, and is preferably 20.0 mass % or less, more preferably 18.0 mass % or less, still preferably 16.0 mass % or less, more still more preferably 15.0 mass % or less, and particularly preferably 14.0 mass % or less, from the viewpoint of obtaining a water-soluble metalworking oil composition having good a defoaming property, based on the total amount (100 mass %) of the composition.

That is, the content of the component (B) is preferably 0.5 to 20.0 mass %, more preferably 1.0 to 18.0 mass %, still preferably 1.5 to 16.0 mass %, still more preferably 2.0 to 15.0 mass %, and particularly preferably 3.0 to 14.0 mass %, based on the total amount (100 mass %) of the composition.

<Unsaturated Fatty Acid Polymer (C)>

The water-soluble metalworking oil composition of the present invention contains an unsaturated fatty acid polymer (C).

As described above, the component (C) is blended in order to suppress a decrease in self-emulsifiability and hard water stability due to the addition of the component (A), and contributes to providing a water-soluble metalworking oil composition having good self-emulsifiability and hard water stability while maintaining excellent processability when used as a metalworking fluid.

Examples of the unsaturated fatty acid to be a monomer constituting the polymer of the component (C) include dodecenoic acid, docosenoic acid, oleic acid, linoleic acid, tall oil fatty acid, ricinoleic acid, linolenic acid, undecylenic acid, elaidic acid, and erucic acid, and a hydroxy unsaturated fatty acid such as ricinoleic acid (12 hydroxyoctadeca-9 enoic acid) may be used.

These unsaturated fatty acids constituting the polymer of the component (C) may be used alone or in combination of two or more thereof.

The number of carbon atoms of the unsaturated fatty acid is preferably 12 to 30, more preferably 14 to 24, and still preferably 16 to 20.

The component (C) used in one aspect of the present invention is preferably a hydroxy unsaturated fatty acid polymer (C1) from the viewpoint of obtaining a water-soluble metalworking oil composition having excellent self-emulsifiability and hard water stability.

Examples of the hydroxy unsaturated fatty acid polymer (C1) include the following aspects of condensed fatty acids (C11) and (C12).

A condensed fatty acid (C11) which is a dehydrated polycondensate of a hydroxy unsaturated fatty acid.

A condensed fatty acid (C12) obtained by dehydration condensation of an alcoholic hydroxyl group of a condensed fatty acid which is a dehydrated polycondensate of a hydroxy unsaturated fatty acid and a monocarboxylic acid.

The hydroxy unsaturated fatty acid to be the monomer of the condensed fatty acids (C11) and (C12) preferably contains ricinoleic acid.

As the monocarboxylic acid constituting the condensed fatty acid (C12), an aliphatic monocarboxylic acid having 4 to 30 (preferably 10 to 24, more preferably 12 to 20) carbon atoms is preferable. The aliphatic monocarboxylic acid may be a saturated aliphatic monocarboxylic acid or an unsaturated aliphatic monocarboxylic acid.

Examples of the saturated aliphatic monocarboxylic acid include caproic acid, enanthic acid, caprylic acid, 2-ethylhexanoic acid, pelargonic acid, isononanoic acid, capric acid, neodecanoic acid, lauric acid, myristic acid, palmitic acid, stearic acid, arachidic acid, behenic acid, and lignoceric acid.

Examples of the unsaturated aliphatic monocarboxylic acid include undecylenic acid, oleic acid, elaidic acid, erucic acid, nervonic acid, linoleic acid, γ-linolenic acid, arachidonic acid, α-linolenic acid, stearidonic acid, eicosapentaenoic acid, and docosahexaenoic acid.

The condensed fatty acid (C12) is preferably a condensed fatty acid obtained by dehydration condensation of an alcoholic hydroxyl group of a dehydrated polycondensate of ricinoleic acid and oleic acid.

The acid value of the component (C) is usually 0 mgKOH/g or more, preferably 10 mgKOH/g or more, more preferably 20 mgKOH/g or more, still preferably 30 mgKOH/g or more, and preferably 110 mgKOH/g or less, more preferably 100 mgKOH/g or less, still preferably 90 mgKOH/g or less from the viewpoint of obtaining a water-soluble metalworking oil composition that can be a metalworking fluid having excellent processability.

The hydroxyl value of the component (C) is preferably 0 to 80 mgKOH/g, more preferably 0 to 60 mgKOH/g, and still preferably 0 to 40 mgKOH/g from the above viewpoint.

The ratio of the acid value to the hydroxyl value [acid value/hydroxyl value] of the component (C) is preferably 1.5 to 15, more preferably 2.0 to 10, and still preferably 2.5 to 9.5 from the above viewpoint.

The saponification value of the component (C) is preferably 180 to 220 mgKOH/g, more preferably 190 to 210 mgKOH/g, and still preferably 195 to 205 mgKOH/g.

In the present description, the acid value means a value measured in accordance with JIS K2501: 2003 (indicator photometric titration method), the hydroxyl value means a value measured in accordance with JIS K0070: 1992, and the saponification value means a value measured in accordance with JIS K2503: 1996.

In the water-soluble metalworking oil composition according to an aspect of the present invention, the content of the component (C) is preferably 7.0 to 34.0 mass %, more preferably 10.0 to 30.0 mass %, based on the total amount (100 mass %) of the composition, from the viewpoint of obtaining a water-soluble metalworking oil composition having excellent self-emulsifiability and hard water stability, and is still preferably 12.0 to 28.0 mass %, still more preferably 15.0 to 27.0 mass %, and particularly preferably 17.0 to 25.0 mass %, from the viewpoint of obtaining a water-soluble metalworking oil composition that can be a metalworking fluid having excellent processability.

<Carboxylic Acid Component>

The water-soluble metalworking oil composition according to an aspect of the present invention may contain a carboxylic acid component together with the unsaturated fatty acid polymer (C) as long as the effect of the present invention is not impaired.

Examples of the carboxylic acid component include the above-described hydroxy unsaturated fatty acid, saturated aliphatic monocarboxylic acid, unsaturated aliphatic monocarboxylic acid, and the like, which can be a monomer component of the polymer (C). In addition, the carboxylic acid component may be a saturated or unsaturated aromatic monocarboxylic acid, a saturated or unsaturated aliphatic dicarboxylic acid, or a saturated or unsaturated aromatic dicarboxylic acid.

Specific examples of the carboxylic acid component include caprylic acid, pelargonic acid, isononanoic acid, capric acid, neodecanoic acid, lauric acid, myristic acid, palmitic acid, stearic acid, oleic acid, linoleic acid, tall oil fatty acid, benzoic acid, p-t-butylbenzoic acid, adipic acid, suberic acid, sebacic acid, azelaic acid, and dodecanedioic acid.

In the water-soluble metalworking oil composition according to an aspect of the present invention, the content of the carboxylic acid component is preferably 0.1 to 20.0 mass %, more preferably 1.0 to 15.0 mass %, and still preferably 3.0 to 10.0 mass %, based on the total amount (100 mass %) of the composition.

The content of the carboxylic acid component based on 100 parts by mass of the total amount of the component (C) is preferably 1 to 100 parts by mass, more preferably 5 to 80 parts by mass, still preferably 10 to 60 parts by mass, and still more preferably 20 to 50 parts by mass.

<Amine Compound (D)>

The water-soluble metalworking oil composition of the present invention contains an amine compound (D) selected from the group consisting of a tertiary amine and a secondary amine.

As described above, the component (D) is blended in order to suppress a decrease in self-emulsifiability and hard water stability due to the addition of the component (A), and contributes to providing a water-soluble metalworking oil composition having good self-emulsifiability and hard water stability while maintaining excellent processability when used as a metalworking fluid.

Examples of the component (D) used in one aspect of the present invention include an alkanolamine, a trialkylamine, and a dialkylamine.

As the alkanolamine that can be selected as the component (D), a compound represented by the following general formula (d1-1) or (d1-2) is preferable.

 (d1-1)

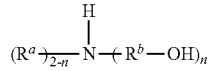 (d1-2)

In the general formulas (d1-1) and (d1-2), each $R^a$ is an independent hydrocarbyl group having 1 to 18 carbon atoms, and each $R^b$ is an independent alkylene group having 1 to 4 carbon atoms independently.

Furthermore, m is an integer of 1 to 3, and n is an integer of 1 to 2.

Examples of the hydrocarbyl group having 1 to 18 carbon atoms that can be selected as $R^a$ include an alkyl group having 1 to 18 (preferably 1 to 12, more preferably 1 to 8, still preferably 1 to 4) carbon atoms, a cycloalkyl group having 5 to 18 (preferably 5 to 12, more preferably 5 to 6) carbon atoms, an alkenyl group having 1 to 18 (preferably 1 to 12, more preferably 1 to 8, still preferably 1 to 4) carbon atoms, an alkylcycloalkyl group having 6 to 18 (preferably 6 to 13, more preferably 6 to 7) carbon atoms, an aryl group having 6 to 18 (preferably 6 to 15, more preferably 6 to 12) carbon atoms, an alkylaryl group having 7 to 18 (preferably 7 to 16, more preferably 7 to 13) carbon atoms, and an arylalkyl group having 7 to 18 (preferably 7 to 16, more preferably 7 to 13) carbon atoms.

The alkyl group as at least a part of the structure of the above-described hydrocarbyl group may be a linear alkyl group or a branched alkyl group.

Among them, $R^a$ is preferably an alkyl group or a cycloalkyl group, and more preferably a cycloalkyl group.

The alkylene group that can be selected as $R^b$ is preferably an ethylene group ($—CH_2CH_2—$) or a propylene group ($—CH_2CH_2CH_2—$), and more preferably an ethylene group.

Examples of the alkanolamine represented by the general formula (d1-1) include monoalkanolamines such as dioleylethanolamine, dilaurylpropanolamine, dioctylethanolamine, dibutylethanolamine, diethylethanolamine, dimethylethanolamine, dihexylpropanolamine, and dibutylpropanolamine; dialkanolamines such as oleyl diethanolamine, cyclohexyl diethanolamine, stearyl dipropanolamine, lauryl diethanolamine, octyl dipropanolamine, butyl diethanolamine, methyl diethanolamine, benzyl diethanolamine, phenyl diethanolamine, tolyl dipropanolamine, and xylyl diethanolamine; and trialkanolamines such as triethanolamine, tripropanolamine, and triisopropanolamine.

Examples of the alkanolamine represented by the general formula (d1-2) include oleyl ethanolamine, oleyl propanolamine, lauryl ethanolamine, lauryl propanolamine, octyl ethanolamine, octyl propanolamine, butyl ethanolamine, butyl propanolamine, methyl ethanolamine, ethyl ethanolamine, cyclohexyl ethanolamine, stearyl propanolamine, benzyl ethanolamine, phenylethanolamine, diethanolamine, dipropanolamine, and diisopropanolamine.

Examples of the trialkylamine include tributylamine, tripentylamine, trihexylamine, tricyclohexylamine, trioctylamine, trilaurylamine, tristearylamine, and N-methyldicyclohexylamine.

In addition, as the tertiary amine other than the trialkylamine, for example, tribenzylamine, trioleylamine, or the like may be used.

Examples of the dialkylamine include dibutylamine, dipentylamine, dihexylamine, dicyclohexylamine, dioctylamine, dilaurylamine, distearylamine, and N-methylcyclohexylamine.

As the secondary amine other than the dialkylamine, for example, dibenzylamine, dioleylamine, or the like may be used.

The component (D) used in an aspect of the present invention preferably contains a tertiary amine, more preferably contains one or more kinds selected from an alkanolamine represented by the general formula (d1-1) and a trialkylamine, and still preferably contains both an alkanolamine represented by the general formula (d1-1) and a trialkylamine, from the viewpoint of obtaining a water-soluble metalworking oil composition having good self-emulsifiability and hard water stability.

In the water-soluble metalworking oil composition according to an aspect of the present invention, the content of the component (D) is preferably 5.0 to 40.0 mass %, more preferably 10.0 to 35.0 mass %, still preferably 15.0 to 30.0 mass %, and still more preferably 20.0 to 27.0 mass % based on the total amount (100 mass %) of the composition from the viewpoint of obtaining a water-soluble metalworking oil composition having excellent self-emulsifiability and hard water stability.

<Primary Amine>

The water-soluble metalworking oil composition according to an aspect of the present invention may contain a primary amine as long as the effect of the present invention is not impaired.

However, from the viewpoint of providing a water-soluble metalworking oil composition having excellent self-emulsifiability and suppressing poor emulsification during preparation of the water-soluble metalworking oil composition, the content of the primary amine is preferably as small as possible.

In the water-soluble metalworking oil composition according to an aspect of the present invention, the content of the primary amine is preferably 0 to 20 parts by mass, more preferably 0 to 10 parts by mass, still preferably 0 to 1 parts by mass, and still more preferably 0 to 0.1 parts by mass, based on 100 parts by mass of the total amount of the component (D).

<Water (E)>

The water-soluble metalworking oil composition according to an aspect of the present invention may further contain water (E) from the viewpoint of imparting flame retardance and improving storage stability.

The water (E) is not particularly limited, and may be, for example, any of distilled water, ion-exchanged water, tap water, and industrial water.

In the water-soluble metalworking oil composition according to an aspect of the present invention, the content of the component (E) is preferably 3.0 to 40.0 mass %, more preferably 5.0 to 35.0 mass %, still preferably 7.0 to 30.0 mass %, and still more preferably 8.0 to 25.0 mass %, based on the total amount (100 mass %) of the composition, from the viewpoint of imparting flame retardance and improving storage stability.

<Various Other Components>

The water-soluble metalworking oil composition according to an aspect of the present invention may further contain various other components other than the components (A) to (E) if necessary, as long as the effect of the present invention is not impaired.

Examples of the other various components include a surfactant (an anionic surfactant, a cationic surfactant) other than the component (B), an oily agent, a lubricity improver, a metal deactivator, a defoaming agent, a disinfectant, an antioxidant, and a friction modifier.

The other various components also include other sulfur compounds other than the above-described component (A) described above, a carboxylic acid component, and a primary amine.

Examples of the anionic surfactant include alkylbenzene sulfonate and alpha olefin sulfonate. Examples of the cationic surfactant include an alkyltrimethylammonium salt, a dialkyldimethylammonium salt, and an alkyldimethylbenzylammonium salt.

Examples of the oily agent include alcohols such as lauryl alcohol, myristyl alcohol, palmityl alcohol, stearyl alcohol, and oleyl alcohol.

Examples of the lubricity improver include the above-described carboxylic acid component described above.

Examples of the metal deactivator include benzotriazole, imidazoline, a pyrimidine derivative, and thiadiazole.

Examples of the antioxidant include amine antioxidants such as an alkylated diphenylamine, phenylnaphthylamine, and an alkylated phenylnaphthylamine; and phenolic antioxidants such as 2,6-di-t-butylphenol, 4,4'-methylenebis(2, 6-di-t-butylphenol), isooctyl-3-(3,5-di-t-butyl-4-hydroxyphenyl)propionate and n-octadecyl-3-(3,5-di-t-butyl-4 hydroxyphenyl)propionate.

Examples of the disinfectant include a triazine preservative and an alkylbenzimidazole preservative.

Examples of the defoaming agent include a methyl silicone oil, a fluorosilicone oil, and a polyacrylate.

Examples of the friction modifier include unsaturated fatty acid esters such as methyl oleate, ethyl oleate, and propyl oleate.

The water-soluble metalworking oil composition according to an aspect of the present invention may further contain one or more base oils selected from a mineral oil and a synthetic oil as long as the effect of the present invention is not impaired.

In the water-soluble metalworking oil composition according to an aspect of the present invention, the content of each of these various components is appropriately set depending on the kind and function of each component, and is preferably 0.01 to 30 mass %, more preferably 0.05 to 20 mass %, and still preferably 0.1 to 15 mass %, based on the total amount (100 mass %) of the water-soluble metalworking oil composition.

<Method for Producing Water-Soluble Metalworking Oil Composition>

The method for producing the water-soluble metalworking oil composition according to an aspect of the present invention is not particularly limited, and is preferably a method including a step of blending the above-described components (A) to (D) and, if necessary, the component (E) and various other components. The order of blending of the components can be appropriately set.

[Properties of Water-Soluble Metalworking Oil Composition]

The acid value of the water-soluble metalworking oil composition according to an aspect of the present invention is preferably 10 to 70 mgKOH/g, more preferably 20 to 60 mgKOH/g, and still preferably 30 to 50 mgKOH/g.

The base number of the water-soluble metalworking oil composition according to an aspect of the present invention is preferably 10 to 100 mgKOH/g, more preferably 30 to 90 mgKOH/g, and still preferably 50 to 80 mgKOH/g.

In the present description, the base number means a value measured in accordance with JIS K2501: 2003 (perchloric acid method).

The ratio of the base number to the acid value of the water-soluble metalworking oil composition according to an aspect of the present invention, that is, [base number/acid value] is preferably 1.0 to 3.0, more preferably 1.1 to 2.5, still preferably 1.3 to 2.2, and still more preferably 1.5 to 2.0.

When the ratio is 1.0 or more, a water-soluble metalworking oil composition having good decay resistance can be obtained. On the other hand, when the ratio is 3.0 or less, the irritation to the skin of the human body can be reduced, which is preferable from the viewpoint of handleability.

In the water-soluble metalworking oil composition according to an aspect of the present invention, the sulfur atom content is preferably 0.70 to 4.00 mass %, more preferably 0.85 to 3.70 mass %, still preferably 1.00 to 3.50 mass %, and still more preferably 1.10 to 3.20 mass %.

In the present description, the sulfur atom content means a value measured in accordance with JIS K2541-6: 2013.

[Metalworking Fluid]

The metalworking fluid of the present invention is obtained by diluting the water-soluble metalworking oil composition according to one aspect of the above-described present invention as a stock solution with dilution water.

The dilution water may be, for example, any of distilled water, ion-exchanged water, tap water, and industrial water.

As described above, the water-soluble metalworking oil composition according to an aspect of the present invention is also excellent in hard water stability, and can suppress occurrence of separation and precipitation even when hard water is used as a diluent water.

Therefore, as the dilution water used in an aspect of the present invention, water having a hardness of 0 to 800 can be used.

In the present description, the hardness is an index of the total content of calcium and magnesium among minerals contained in water, and means a value (American hardness) obtained by converting the amount of calcium and magnesium contained in 1 L of water into the amount of calcium carbonate, and can be calculated from the following formula.

$$\text{Hardness (mg/L)} = \text{Ca (mg/L)} \times 2.497 + \text{Mg (mg/L)} \times 4.118$$

The dilution concentration of the metalworking fluid according to an aspect of the present invention is preferably 1 to 50 vol %, more preferably 3 to 40 vol %, and still preferably 5 to 30 vol %.

In the present description, the "dilution concentration" means a value calculated from the following formula.

"Dilution concentration (vol %)"=[volume amount of water-soluble metalworking oil composition]/ [[volume amount of water-soluble metalworking oil composition]+[volume amount of dilution water]]×100

The value of the tap torque measured using the metalworking fluid according to an aspect of the present invention under the rolled tapping processing conditions described in Examples described later is preferably 260 N·cm or less, more preferably 255 N·cm or less, still preferably 250 N·cm or less, still more preferably 245 N·cm or less, and particularly preferably 240 N·cm or less.

The wear width of the front flank surface of a tool when the turning test is performed under the conditions described in Examples described later using the metalworking fluid according to an aspect of the present invention is preferably 130 μm or less, more preferably 120 μm or less, still preferably 110 μm or less, still more preferably 100 μm or less, and particularly preferably 95 μm or less.

[Use of Water-Soluble Metalworking Oil Composition and Metalworking Method]

The water-soluble metalworking oil composition according to a preferred aspect of the present invention is excellent in various properties such as processability, self-emulsifiability, and hard water stability, and can be suitably used as a metalworking fluid after being diluted.

The workpiece to be processed using the water-soluble metalworking oil composition according to an aspect of the present invention is not particularly limited, and is particularly suitable for a workpiece including a metal selected from the group consisting of titanium, a titanium alloy, alloy steel, a nickel base alloy, a niobium alloy, a tantalum alloy, a molybdenum alloy, a tungsten alloy, stainless steel, and high manganese steel, is more suitable for stainless steel, a nickel base alloy, and a titanium alloy, and is particularly suitable for stainless steel and a nickel base alloy.

These workpieces are generally very hard and difficult-to-process materials, and are metal materials that have problems such as increased tool wear and cannot handle with high-speed processing and must perform low-speed processing. However, when the water-soluble metalworking oil composition according to an aspect of the present invention is used, excellent processability can be exhibited even for such a difficult-to-process material.

Therefore, the present invention can also provide the following [1] and [2].

[1] A use method including applying the water-soluble metalworking oil composition according to one aspect of the present invention to processing of a workpiece made of a metal.

[2] A metalworking method including processing a workpiece made of metal using a metalworking fluid obtained by diluting the above-described water-soluble metalworking oil composition according to one aspect of the present invention with dilution water.

The details of the workpiece according to [1] and [2] and the metalworking fluid according to [2] are as described above.

In the above [1] and [2], examples of the processing of the workpiece include cutting, grinding, punching, polishing, drawing, reducing, and rolling.

In the use method of the above [1] and the metalworking method of the above [2], the water-soluble metalworking oil composition is diluted with dilution water to obtain a metalworking fluid as described above, then supplied to a workpiece, brought into contact with the workpiece and is used. The metalworking fluid lubricates between the workpiece and the processing tool. Furthermore, it is also used for removal of swarf, rust prevention of a workpiece, and cooling of a tool and a workpiece.

EXAMPLES

Next, the present invention is described in more detail with reference to Examples, but the present invention is not limited by these Examples. Measurement methods of various physical properties are as follows.

(1) Kinematic Viscosity

Measurement was performed in accordance with JIS K2283: 2000.

(2) Sulfur Atom Content

Measurement was performed in accordance with JIS K2541-6: 2013.

(3) HLB

Calculation was performed by a Griffin method.

(4) Acid Value

Measurement was performed in accordance with JIS K2501: 2003 (indicator photometric titration method).

(5) Base Number

Measurement was performed in accordance with JIS K2501: 2003 (perchloric acid method).

(6) Saponification Value

Measurement was performed in accordance with JIS K2503: 1996.

(7) Hydroxyl Value

Measurement was performed in accordance with JIS K0070: 1992.

In addition, the details of each component used for the preparation of the water-soluble metalworking oil composition in the following Examples and Comparative Examples are as follows.

<Sulfur Compound>

Sulfurized fat and oil (a-i): sulfurized fat and oil having a kinematic viscosity at 40° C. of 55.0 mm$^2$/s and a sulfur atom content of 17.5 mass %

Sulfurized fat and oil (a-ii): sulfurized fat and oil having a kinematic viscosity at 40° C. of 381.7 mm$^2$/s and a sulfur atom content of 10.4 mass %

Sulfurized fat and oil (a-iii): sulfurized fat and oil having a kinematic viscosity at 40° C. of 900.0 mm$^2$/s and a sulfur atom content of 11.6 mass %

Sulfurized olefin (a-iv): sulfurized olefin having a sulfur chain length of 5, a kinematic viscosity at 40° C. of 45.0 mm$^2$/s, a sulfur atom content of 39.0 mass %.

<Nonionic Surfactant>

POA alkyl ether (b-i): polyoxyethylene-polyoxypropylene alkyl ether having an alkyl group having 10 to 13 carbon atoms, HLB=12.7.

POA alkyl ether (b-ii): polyoxyethylene-polyoxypropylene alkyl ether having an alkyl group having 12 carbon atoms, HLB=14.0.

POA alkyl ether (b-iii): polyoxyethylene-polyoxypropylene alkyl ether having an alkyl group having 12 carbon atoms, HLB=3.0.

<Unsaturated Fatty Acid Polymer>

Polymerized fatty acid (c-i): A polymerized fatty acid obtained by thermal dehydration condensation of ricinoleic acid at 200° C. under a nitrogen stream Acid value=52 mgKOH/g, saponification value=196 mgKOH/g, hydroxyl value: 20 mgKOH/g Polymerized fatty acid (c-ii): A polymerized fatty acid obtained by thermal dehydration condensation of ricinoleic acid at 200° C. under a nitrogen stream, further adding lauric acid, and thermal dehydration condensation Acid value=85 mgKOH/g, saponification value=200 mgKOH/g, hydroxyl value: 9 mgKOH/g <Amine Compound>

Tertiary amine (d-i): cyclohexyldiethanolamine

Tertiary amine (d-ii): N-methyldicyclohexylamine

Primary amine (d'): monoisopropanolamine

<Carboxylic Acid Component>

Tall oil fatty acid: unsaturated monocarboxylic acid mainly composed of oleic acid, linoleic acid or the like Neodecanoic acid: saturated aliphatic monocarboxylic acid Dodecanedioic acid: saturated aliphatic dicarboxylic acid <Other Components>

Benzotriazole

Methyl oleate: kinematic viscosity at 40° C.=4.7 mm$^2$/s

Water

Examples 1 to 10, Comparative Examples 1 to 10

Sulfur compounds, nonionic surfactants, unsaturated fatty acid polymers, amine compounds, carboxylic acid components, and other components were mixed in the kinds and blending amounts shown in Tables 1 and 2 to prepare water-soluble metalworking oil compositions, respectively.

The acid value and the base number of the prepared water-soluble metalworking oil composition were measured, and the following evaluations were performed. These results are shown in Tables 1 and 2.

(1) Processability

The water-soluble metalworking oil compositions obtained in Examples and Comparative Examples were diluted with water to prepare a metalworking fluid having a dilution concentration of 5% by volume. Rolled tapping processing was performed under the following conditions using the prepared metalworking fluid, and the average tap torque at the time of processing was measured. The average tap torque was measured 3 times, the average value thereof was calculated, and when the average tap torque value was 260 N·cm or less, it was determined that the metalworking oil has good processability. It can be said that the smaller the value of the average tap torque, the better the processability of the metalworking oil.

(Rolled Tapping Processing Conditions)

Processing machine used: Megatap II (microtap GmbH)

Tool: Nu-Roll Tap VP-NRT B M6X1 (OSG) (manufactured by OSG Corporation)

Processing speed (tap peripheral speed): 10 m/min

Processing depth (processing distance): 10 mm

Workpiece material: SCM440

Pilot hole diameter: 5.52 mm (2) Self-Emulsifiability

To a 100 mL measuring cylinder containing 95 mL of water, 5 mL of the water-soluble metalworking oil composition obtained in Examples and Comparative Examples was added and the measuring cylinder was turned over 10 times in the vertical direction, then the liquid in the measuring cylinder was visually observed, and the self-emulsifiability was evaluated based on the following criteria.

A: The water-soluble metalworking oil composition is uniformly dissolved with water.

F: Solubility residue of the water-soluble metalworking oil composition is partially observed.

(3) Hard Water Stability

A sample solution having a dilution concentration of 5% by volume was prepared using water prepared to have a hardness of 500 with Mg ions and the water-soluble metalworking oil compositions obtained in Examples and Comparative Examples. Then, the sample solution was visually observed, and the hard water stability was evaluated based on the following criteria.

A: The sample solution is in a uniform state.

F: Separation or precipitation occurs in the sample solution.

TABLE 1

|  |  |  |  | Example 1 | Example 2 | Example 3 | Example 4 | Example 5 |
|---|---|---|---|---|---|---|---|---|
| Composition | sulfur compound | Sulfurized fat and oil (a-i) | mass % | 12.5 | — | 17.5 | 7.0 | 12.5 |
|  |  | Sulfurized fat and oil (a-ii) | mass % | — | 12.5 | — | — | — |
|  |  | Sulfurized fat and oil (a-iii) | mass % | — | — | — | — | — |
|  | Nonionic surfactant | POA alkyl ether (b-i), HLB = 12.7 | mass % | 5.0 | 5.0 | 5.0 | 5.0 | — |
|  |  | POA alkyl ether (b-ii), HLB = 14.0 | mass % | — | — | — | — | 5.0 |
|  |  | POA alkyl ether (b-iii), HLB = 3.0 | mass % | — | — | — | — | — |

TABLE 1-continued

|  |  |  |  |  |  |  |  |  |
|---|---|---|---|---|---|---|---|---|
| Composition | Unsaturated fatty acid polymer | Polymerized fatty acid (c-i) | mass % | 20.0 | 20.0 | 20.0 | 20.0 | 20.0 |
|  |  | Polymerized fatty acid (c-ii) | mass % | — | — | — | — | — |
|  | Amine compound | Tertiary amine (d-i) | mass % | 18.5 | 18.5 | 18.5 | 18.5 | 18.5 |
|  |  | Tertiary amine (d-ii) | mass % | 5.5 | 5.5 | 5.5 | 5.5 | 5.5 |
|  |  | Primary amine (d-iii) | mass % | — | — | — | — | — |
|  | Carboxylic acid component | Tall oil fatty acid | mass % | 2.0 | 2.0 | 2.0 | 2.0 | 2.0 |
|  |  | Neodecanoic acid | mass % | 4.3 | 4.3 | 4.3 | 4.3 | 4.3 |
|  |  | Dodecanedioic acid | mass % | 1.0 | 1.0 | 1.0 | 1.0 | 1.0 |
|  | Other components | Benzotriazole | mass % | 1.0 | 1.0 | 1.0 | 1.0 | 1.0 |
|  |  | Methyl oleate | mass % | 12.0 | 12.0 | 7.0 | 17.5 | 12.0 |
|  |  | Water | mass % | 18.2 | 18.2 | 18.2 | 18.2 | 18.2 |
|  |  | Total | mass % | 100.0 | 100.0 | 100.0 | 100.0 | 100.0 |
| Content ratio of two components | Nonionic surfactant/Sulfur compound | | (mass ratio) | 0.40 | 0.40 | 0.29 | 0.71 | 0.40 |
|  | Unsaturated fatty acid polymer/Sulfur compound | | (mass ratio) | 1.60 | 1.60 | 1.14 | 2.86 | 1.60 |
|  | Amine compound/Sulfur compound | | (mass ratio) | 1.92 | 1.92 | 1.37 | 3.43 | 1.92 |
|  | Unsaturated fatty acid polymer/Nonionic surfactant | | (mass ratio) | 4.00 | 4.00 | 4.00 | 4.00 | 4.00 |
|  | Amine compound/Nonionic surfactant | | (mass ratio) | 4.80 | 4.80 | 4.80 | 4.80 | 4.80 |
|  | Amine compound/Unsaturated fatty acid polymer | | (mass ratio) | 1.20 | 1.20 | 1.20 | 1.20 | 1.20 |
| Properties | Acid value | | mgKOH/g | 38.2 | 38.2 | 38.2 | 38.2 | 38.2 |
|  | Base number | | mgKOH/g | 70.7 | 70.7 | 70.7 | 70.7 | 70.7 |
|  | Base number/Acid value | | — | 1.8 | 1.8 | 1.8 | 1.8 | 1.8 |
|  | Sulfur atom content | | mass % | 2.19 | 1.30 | 3.06 | 1.23 | 2.19 |
| Evaluations | Processability: Average tap torque | | N·cm | 239 | 230 | 231 | 251 | 240 |
|  | Self-emulsifiability | | — | A | A | A | A | A |
|  | Hard water stability | | — | A | A | A | A | A |

|  |  |  |  | Example 6 | Example 7 | Example 8 | Example 9 | Example 10 |
|---|---|---|---|---|---|---|---|---|
| Composition | sulfur compound | Sulfurized fat and oil (a-i) | mass % | 12.5 | 12.5 | 12.5 | 12.5 | 12.5 |
|  |  | Sulfurized fat and oil (a-ii) | mass % | — | — | — | — | — |
|  |  | Sulfurized fat and oil (a-iii) | mass % | — | — | — | — | — |
|  | Nonionic surfactant | POA alkyl ether (b-i), HLB = 12.7 | mass % | 3.0 | 10.0 | 5.0 | 5.0 | 5.0 |
|  |  | POA alkyl ether (b-ii), HLB = 14.0 | mass % | — | — | — | — | — |
|  |  | POA alkyl ether (b-iii), HLB = 3.0 | mass % | — | — | — | — | — |
|  | Unsaturated fatty acid polymer | Polymerized fatty acid (c-i) | mass % | 20.0 | 20.0 | — | 25.0 | 15.0 |
|  |  | Polymerized fatty acid (c-ii) | mass % | — | — | 20.0 | — | — |
|  | Amine compound | Tertiary amine (d-i) | mass % | 18.5 | 18.5 | 18.5 | 18.5 | 18.5 |
|  |  | Tertiary amine (d-ii) | mass % | 5.5 | 5.5 | 5.5 | 5.5 | 5.5 |
|  |  | Primary amine (d-iii) | mass % | — | — | — | — | — |
|  | Carboxylic acid component | Tall oil fatty acid | mass % | 2.0 | 2.0 | 2.0 | 2.0 | 2.0 |
|  |  | Neodecanoic acid | mass % | 4.3 | 4.3 | 4.3 | 4.3 | 4.3 |
|  |  | Dodecanedioic acid | mass % | 1.0 | 1.0 | 1.0 | 1.0 | 1.0 |
|  | Other components | Benzotriazole | mass % | 1.0 | 1.0 | 1.0 | 1.0 | 1.0 |
|  |  | Methyl oleate | mass % | 12.0 | 12.0 | 12.0 | 12.0 | 12.0 |
|  |  | Water | mass % | 20.2 | 13.2 | 18.2 | 13.2 | 23.2 |
|  |  | Total | mass % | 100.0 | 100.0 | 100.0 | 100.0 | 100.0 |
| Content ratio of two components | Nonionic surfactant/Sulfur compound | | (mass ratio) | 0.24 | 0.80 | 0.40 | 0.40 | 0.40 |
|  | Unsaturated fatty acid polymer/Sulfur compound | | (mass ratio) | 1.60 | 1.60 | 1.60 | 2.00 | 1.20 |
|  | Amine compound/Sulfur compound | | (mass ratio) | 1.92 | 1.92 | 1.92 | 1.92 | 1.92 |
|  | Unsaturated fatty acid polymer/Nonionic surfactant | | (mass ratio) | 6.67 | 2.00 | 4.00 | 5.00 | 3.00 |
|  | Amine compound/Nonionic surfactant | | (mass ratio) | 8.00 | 2.40 | 4.80 | 4.80 | 4.80 |
|  | Amine compound/Unsaturated fatty acid polymer | | (mass ratio) | 1.20 | 1.20 | 1.20 | 0.96 | 1.60 |
| Properties | Acid value | | mgKOH/g | 38.2 | 38.2 | 44.8 | 40.8 | 35.6 |
|  | Base number | | mgKOH/g | 70.7 | 70.7 | 70.7 | 70.7 | 70.7 |
|  | Base number/Acid value | | — | 1.8 | 1.8 | 1.6 | 1.7 | 2.0 |
|  | Sulfur atom content | | mass % | 2.19 | 2.19 | 2.19 | 2.19 | 2.19 |
| Evaluations | Processability: Average tap torque | | N·cm | 238 | 242 | 255 | 235 | 248 |
|  | Self-emulsifiability | | — | A | A | A | A | A |
|  | Hard water stability | | — | A | A | A | A | A |

TABLE 2

|  |  |  |  | Comparative Example 1 | Comparative Example 2 | Comparative Example 3 | Comparative Example 4 | Comparative Example 5 |
|---|---|---|---|---|---|---|---|---|
| Composition | Sulfur compound | Sulfurized fat and oil (a-i) | mass % | — | — | 3.0 | 25.0 | 12.5 |
|  |  | Sulfurized fat and oil (a-ii) | mass % | — | 12.5 | — | — | — |
|  |  | Sulfurized fat and oil (a-iii) | mass % | — | — | — | — | — |
|  | Nonionic surfactant | POA alkyl ether (b-i), HLB = 12.7 | mass % | 5.0 | 5.0 | 5.0 | 5.0 | 0.3 |
|  |  | POA alkyl ether (b-ii), HLB = 14.0 | mass % | — | — | — | — | — |
|  |  | POA alkyl ether (b-iii), HLB = 3.0 | mass % | — | — | — | — | — |

TABLE 2-continued

|  |  |  |  |  |  |  |  |  |
|---|---|---|---|---|---|---|---|---|
| | Unsaturated fatty acid polymer | Polymerized fatty acid (c-i) | mass % | 20.0 | 20.0 | 20.0 | 20.0 | 20.0 |
| | | Polymerized fatty acid (c-ii) | mass % | — | — | — | — | — |
| | Amine compound | Tertiary amine (d-i) | mass % | 18.5 | 18.5 | 18.5 | 18.5 | 18.5 |
| | | Tertiary amine (d-ii) | mass % | 5.5 | 5.5 | 5.5 | 5.5 | 5.5 |
| | | Primary amine (d-iii) | mass % | — | — | — | — | — |
| | Carboxylic acid component | Tall oil fatty acid | mass % | 2.0 | 2.0 | 2.0 | 2.0 | 2.0 |
| | | Neodecanoic acid | mass % | 4.3 | 4.3 | 4.3 | 4.3 | 4.3 |
| | | Dodecanedioic acid | mass % | 1.0 | 1.0 | 1.0 | 1.0 | 1.0 |
| | Other components | Benzotriazole | mass % | 1.0 | 1.0 | 1.0 | 1.0 | 1.0 |
| | | Methyl oleate | mass % | 24.5 | 12.0 | 21.5 | — | 12.0 |
| | | Water | mass % | 18.2 | 18.2 | 18.2 | 17.7 | 22.9 |
| | Total | | mass % | 100.0 | 100.0 | 100.0 | 100.0 | 100.0 |
| Content ratio of two components | Nonionic surfactant/Sulfur compound | | (mass ratio) | — | 0.40 | 1.67 | 0.20 | 0.02 |
| | Unsaturated fatty acid polymer/Sulfur compound | | (mass ratio) | — | 1.60 | 6.67 | 0.80 | 1.60 |
| | Amine compound/Sulfur compound | | (mass ratio) | — | 1.92 | 8.00 | 0.96 | 1.92 |
| | Unsaturated fatty acid polymer/Nonionic surfactant | | (mass ratio) | 4.00 | 4.00 | 4.00 | 4.00 | 66.67 |
| | Amine compound/Nonionic surfactant | | (mass ratio) | 4.80 | 4.80 | 4.80 | 4.80 | 80.00 |
| | Amine compound/Unsaturated fatty acid polymer | | (mass ratio) | 1.20 | 1.20 | 1.20 | 1.20 | 1.20 |
| Properties | Acid value | | mgKOH/g | 38.2 | 38.2 | 38.2 | 38.2 | 38.2 |
| | Base number | | mgKOH/g | 70.7 | 70.7 | 70.7 | 70.7 | 70.7 |
| | Base number/Acid value | | — | 1.8 | 1.8 | 1.8 | 1.8 | 1.8 |
| | Sulfur atom content | | mass % | 0 | 1.45 | 0.53 | 4.38 | 2.19 |
| Evaluations | Processability: average tap torque | | N·cm | 290 | 265 | 275 | 232 | 238 |
| | Self-emulsifiability | | — | A | F | A | F | A |
| | Hard water stability | | — | A | F | A | F | F |

|  |  |  |  | Comparative Example 6 | Comparative Example 7 | Comparative Example 8 | Comparative Example 9 | Comparative Example 10 |
|---|---|---|---|---|---|---|---|---|
| Composition | Sulfur compound | Sulfurized fat and oil (a-i) | mass % | 12.5 | 12.5 | 12.5 | 12.5 | 12.5 |
| | | Sulfurized fat and oil (a-ii) | mass % | — | — | — | — | — |
| | | Sulfurized fat and oil (a-iii) | mass % | — | — | — | — | — |
| | Nonionic surfactant | POA alkyl ether (b-i), HLB = 12.7 | mass % | — | 5.0 | 5.0 | 5.0 | 5.0 |
| | | POA alkyl ether (b-ii), HLB = 14.0 | mass % | — | — | — | — | — |
| | | POA alkyl ether (b-iii), HLB = 3.0 | mass % | 5.0 | — | — | — | — |
| | Unsaturated fatty acid polymer | Polymerized fatty acid (c-i) | mass % | 20.0 | 5.0 | 35.0 | — | 20.0 |
| | | Polymerized fatty acid (c-ii) | mass % | — | — | — | — | — |
| | Amine compound | Tertiary amine (d-i) | mass % | 18.5 | 18.5 | 18.5 | 18.5 | — |
| | | Tertiary amine (d-ii) | mass % | 5.5 | 5.5 | 5.5 | 5.5 | — |
| | | Primary amine (d-iii) | mass % | — | — | — | — | 24.0 |
| | Carboxylic acid component | Tall oil fatty acid | mass % | 2.0 | 2.0 | 2.0 | 22.0 | 2.0 |
| | | Neodecanoic acid | mass % | 4.3 | 4.3 | 4.3 | 4.3 | 4.3 |
| | | Dodecanedioic acid | mass % | 1.0 | 1.0 | 1.0 | 1.0 | 1.0 |
| | Other components | Benzotriazole | mass % | 1.0 | 1.0 | 1.0 | 1.0 | 1.0 |
| | | Methyl oleate | mass % | 12.0 | 12.0 | 12.0 | 12.0 | 12.0 |
| | | Water | mass % | 18.2 | 33.2 | 3.2 | 18.2 | 18.2 |
| | Total | | mass % | 100.0 | 100.0 | 100.0 | 100.0 | 100.0 |
| Content ratio of two components | Nonionic surfactant/Sulfur compound | | (mass ratio) | 0.40 | 0.40 | 0.40 | 0.40 | 0.40 |
| | Unsaturated fatty acid polymer/Sulfur compound | | (mass ratio) | 1.60 | 0.40 | 2.80 | — | 1.60 |
| | Amine compound/Sulfur compound | | (mass ratio) | 1.92 | 1.92 | 1.92 | 1.92 | 1.92 |
| | Unsaturated fatty acid polymer/Nonionic surfactant | | (mass ratio) | 4.00 | 1.00 | 7.00 | — | 4.00 |
| | Amine compound/Nonionic surfactant | | (mass ratio) | 4.80 | 4.80 | 4.80 | 4.80 | 4.80 |
| | Amine compound/Unsaturated fatty acid polymer | | (mass ratio) | 1.20 | 4.80 | 0.69 | — | 1.20 |
| Properties | Acid value | | mgKOH/g | 38.2 | 30.4 | 46.0 | 68.0 | 38.2 |
| | Base number | | mgKOH/g | 70.7 | 70.7 | 70.7 | 70.7 | 129.8 |
| | Base number/Acid value | | — | 1.8 | 2.3 | 1.5 | 1.0 | 3.4 |
| | Sulfur atom content | | mass % | 2.19 | 2.19 | 2.19 | 2.19 | 2.19 |
| Evaluations | Processability: average tap torque | | N·cm | 236 | (*) | 230 | (*) | (*) |
| | Self-emulsifiability | | — | A | | F | | |
| | Hard water stability | | — | F | | A | | |

(*): Since the resulting water-soluble metalworking oil composition had poor emulsification, various evaluations were not performed.

From Table 1, the metalworking fluid obtained by diluting the water-soluble metalworking oil composition prepared in Example 1 to 10 had a small average tap torque value, and was excellent in processability. The water-soluble metalworking oil composition was also good in self-emulsifiability and hard water stability.

On the other hand, from Table 2, it is determined that the metalworking fluid obtained by diluting the water-soluble metalworking oil composition prepared in Comparative Example 1 to 3 has a large average tap torque value and is poor in processability. The water-soluble metalworking oil compositions prepared in Comparative Examples 2, 4 to 6, and 8 had a problem in at least one of self-emulsifiability and hard water stability. In Comparative Examples 7, 9, and 10, since the resulting water-soluble metalworking oil composition had poor emulsification, various evaluations were not performed.

Example 11, Comparative Examples 11 to 12

Sulfur compounds, nonionic surfactants, unsaturated fatty acid polymers, amine compounds, carboxylic acid components, and other components were mixed in the kinds and blending amounts shown in Table 3 to prepare water-soluble metalworking oil compositions, respectively.

The acid value and the base number of the prepared water-soluble metalworking oil composition were measured, and the turning test was performed. The results are shown in Table 3.

(4) Turning Test

The water-soluble metalworking oil compositions obtained in Examples and Comparative Examples were diluted with water to prepare a metalworking fluid having a dilution concentration of 10 mass %. The wear width (unit: μm) of the front flank surface of the tool when the workpiece material was processed under the following conditions was measured using the prepared metalworking fluid. When the value of the wear width was 130 μm or less, it was determined that the metalworking oil was good in processability for a difficult-to-process material. It can be said that as the value of the wear width is smaller, the metalworking oil is more excellent in processability for a difficult-to-process material.

(Processing Conditions of Workpiece Material)
Lathe: QT-15N (Product name, manufactured by YAMAZAKI MAZAK CORPORATION)
Tool: CNMG120404-MS VP15TF (Product name, manufactured by Mitsubishi Materials Corporation)
Tool tip holder: DCLNL2020K12 (Product name, manufactured by Mitsubishi Materials Corporation)
Workpiece material: SUS630
Cutting speed: 150 m/min
Feed: 0.2 mm/rev
Cutting: 0.5 mm
Cutting distance: 2,000 m

TABLE 3

| | | | | Example 11 | Comparative Example 11 | Comparative Example 12 |
|---|---|---|---|---|---|---|
| Composition | Sulfur compound | Sulfurized fat and oil (a-i) | mass % | 12.5 | — | — |
| | | Sulfurized fat and oil (a-ii) | mass % | — | — | — |
| | | Sulfurized fat and oil (a-iii) | mass % | — | — | — |
| | | Sulfurized fat and oil (a-iv) | mass % | — | 12.5 | 5.6 |
| | Nonionic surfactant | POA alkyl ether (b-i), HLB = 12.7 | mass % | 5.0 | 5.0 | 5.0 |
| | | POA alkyl ether (b-ii), HLB = 14.0 | mass % | — | — | — |
| | | POA alkyl ether (b-iii), HLB = 3.0 | mass % | — | — | — |
| | Unsaturated fatty acid polymer | Polymerized fatty acid (c-i) | mass % | 20.0 | 20.0 | 20.0 |
| | | Polymerized fatty acid (c-ii) | mass % | — | — | — |
| | Amine compound | Tertiary amine (d-i) | mass % | 18.5 | 18.5 | 18.5 |
| | | Tertiary amine (d-ii) | mass % | 5.5 | 5.5 | 5.5 |
| | | Primary amine (d-iii) | mass % | — | — | — |
| | Carboxylic acid component | tall oil fatty acid | mass % | 2.0 | 2.0 | 2.0 |
| | | Neodecanoic acid | mass % | 4.3 | 4.3 | 4.3 |
| | | Dodecanedioic acid | mass % | 1.0 | 1.0 | 1.0 |
| | Other components | Benzotriazole | mass % | 1.0 | 1.0 | 1.0 |
| | | Methyl oleate | mass % | 12.0 | 12.0 | 12.0 |
| | | Water | mass % | 18.2 | 18.2 | 25.1 |
| | Total | | mass % | 100.0 | 100.0 | 100.0 |
| Content ratio of 2 components | Nonionic surfactant/Sulfur compound | | (mass ratio) | 0.40 | 0.40 | 0.89 |
| | Unsaturated fatty acid polymer/Sulfur compound | | (mass ratio) | 1.60 | 1.60 | 3.57 |
| | Amine compound/Sulfur compound | | (mass ratio) | 1.92 | 1.92 | 4.29 |
| | Unsaturated fatty acid polymer/Nonionic surfactant | | (mass ratio) | 4.00 | 4.00 | 4.00 |
| | Amine compound/Nonionic surfactant | | (mass ratio) | 4.80 | 4.80 | 4.80 |
| | Amine compound/Unsaturated fatty acid polymer | | (mass ratio) | 1.20 | 1.20 | 1.20 |
| Properties | Acid value | | mgKOH/g | 38.2 | 38.2 | 38.2 |
| | Base number | | mgKOH/g | 70.7 | 70.7 | 70.7 |
| | Base number/Acid value | | — | 1.8 | 1.8 | 1.8 |
| | Sulfur atom content | | mass % | 2.19 | 4.88 | 2.18 |
| Evaluations | Turning test: Wear width of front flank surface | | μm | 91 | 142 | 138 |

From Table 3, it can be said that the metalworking fluid prepared by diluting the water-soluble metalworking oil composition prepared in Example 11 has a small wear width of the front flank surface of the tool, and therefore has excellent processability even for difficult-to-process materials such as stainless steel.

On the other hand, in the metalworking fluid prepared by diluting the water-soluble metalworking oil composition prepared in Comparative Examples 11 to 12, the wear width of the front flank surface of the tool was as large as more than 130 μm, resulting in inferior processability for difficult-to-process materials such as stainless steel.

The invention claimed is:

1. A water-soluble metalworking oil composition, comprising:
7.0 to 17.5 mass % of a sulfur compound (A) that is at least one selected from the group consisting of a sulfurized fat and oil and a sulfurized ester and has a kinematic viscosity at 40° C. of 55.0 to 381.7 mm$^2$/s;
3.0 to 10.0 mass % of a nonionic surfactant (B) comprising a polyoxyethylene-polyoxypropylene alkyl ether having an alkyl group having 10 to 13 carbon atoms having an HLB of 12.7 to 14.0;
15.0 to 25.0 mass % of an unsaturated fatty acid polymer (C) comprising a polymerized fatty acid obtained by thermal dehydration condensation of ricinoleic acid; and 20.0 to 27.0 mass % of an amine compound (D) comprising at least one tertiary amine;
wherein a mass ratio of the nonionic surfactant (B) to the sulfur compound (A), [(B)/(A)] is 0.24 to 0.80,
wherein the water-soluble metalworking oil composition has an average tap torque of 251 N·cm or less,
wherein the water-soluble metalworking oil composition is capable of being uniformly dissolved in water in at least a volume ratio of 5 parts of the water-soluble metalworking oil composition to 95 parts of the water,
wherein the water-soluble metalworking oil is capable of being in a uniform state when prepared as a 5% by volume solution using water to have a hardness of 500 with Mg ions.

2. The water-soluble metalworking oil composition according to claim 1, wherein the water-soluble metalworking oil composition has a base number and an acid value, and a ratio of the base number to the acid value, base number/acid value is 1.0 to 3.0.

3. The water-soluble metalworking oil composition according to claim 1, which is used for processing a workpiece made of a metal selected from the group consisting of titanium, a titanium alloy, alloy steel, a nickel base alloy, a niobium alloy, a tantalum alloy, a molybdenum alloy, a tungsten alloy, stainless steel, and high manganese steel.

4. A metalworking fluid obtained by diluting the water-soluble metalworking oil composition according to claim 1 with the addition of dilution water.

5. The metalworking fluid according to claim 4, wherein the dilution water has a hardness of 500 to 800.

6. The metalworking fluid according to claim 4, wherein the metalworking fluid is obtained by diluting the water-soluble metalworking oil composition with the addition of dilution water to have a dilution concentration of 1 to 50 vol %.

7. A metalworking method for processing a workpiece made of a metal using the metalworking fluid according to claim 4 comprising applying the metalworking fluid to the workpiece.

8. The water-soluble metalworking oil composition according to claim 1, wherein the polymerized fatty acid is obtained by thermal dehydration condensation of ricinoleic acid at 200° C. under a nitrogen stream.

9. The water-soluble metalworking oil composition according to claim 1, wherein the polymerized fatty acid has an acid value of 52-85 mgKOH/g, a saponification value of 196-200 mgKOH/g, and a hydroxyl value of 9-20 mgKOH/g.

10. The water-soluble metalworking oil composition according to claim 1, wherein the at least one tertiary amine is selected from the group consisting of a trialkylamine and an alkanolamine represented by formula (d1-1):

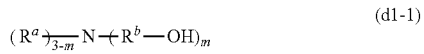

where m is an integer of 1 to 3,
each $R^a$ is an independent cycloalkyl group having 5 to 6 carbon atoms, and
each $R^b$ is an independent alkylene group having 1 to 4 carbon atoms.

11. The water-soluble metalworking oil composition according to claim 10, wherein the at least one tertiary amine includes cyclohexyldiethanolamine and N-methyldicyclohexylamine.

12. The water-soluble metalworking oil composition according to claim 1, further comprising 3.0 to 10.0 mass % of at least one carboxylic acid.

13. The water-soluble metalworking oil composition according to claim 1, wherein the water-soluble metalworking oil composition has an average tap torque of 251 N·cm or less, and 231 N·cm or more.

14. The water-soluble metalworking oil composition according to claim 1, wherein:
the polymerized fatty acid has a concentration of 20.0 mass % based on a total amount of the water-soluble metalworking oil composition,
the amine compound (D) includes 18.5 mass % of cyclohexyldiethanolamine and 5.5 mass % of N-methyldicyclohexylamine based on a total amount of the water-soluble metalworking oil composition, and
the polyoxyethylene-polyoxypropylene alkyl ether has an HLB of 12.7.

15. The water-soluble metalworking oil composition according to claim 1, wherein the sulfur compound (A) comprises a sulfurized ester and does not include a sulfurized fat and oil.

* * * * *